United States Patent
Miao et al.

(10) Patent No.: US 11,304,200 B2
(45) Date of Patent: Apr. 12, 2022

(54) METHODS AND APPARATUSES FOR TRANSMITTING AND RECEIVING A PREEMPTION INDICATION

(71) Applicant: NEC CORPORATION, Tokyo (JP)

(72) Inventors: Zhaobang Miao, Beijing (CN); Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 16/643,285

(22) PCT Filed: Aug. 29, 2017

(86) PCT No.: PCT/CN2017/099510
§ 371 (c)(1),
(2) Date: Feb. 28, 2020

(87) PCT Pub. No.: WO2019/041137
PCT Pub. Date: Mar. 7, 2019

(65) Prior Publication Data
US 2020/0351887 A1    Nov. 5, 2020

(51) Int. Cl.
*H04W 72/04* (2009.01)
*H04W 76/27* (2018.01)

(52) U.S. Cl.
CPC ..... *H04W 72/0493* (2013.01); *H04W 72/042* (2013.01); *H04W 72/0453* (2013.01); *H04W 76/27* (2018.02)

(58) Field of Classification Search
CPC ........... H04W 72/0493; H04W 72/042; H04W 72/0453; H04W 72/1242; H04W 72/1289; H04W 76/27
See application file for complete search history.

(56) References Cited

U.S. PATENT DOCUMENTS

2016/0212625 A1    7/2016 Damnjanovic et al.
2017/0142740 A1    5/2017 Gou et al.
(Continued)

FOREIGN PATENT DOCUMENTS

CN    105657847 A    6/2016
JP    2017528939 A    9/2017
(Continued)

OTHER PUBLICATIONS

Qualcomm, URLLC DL pre-emption and UL suspension indication channel design, 3GPP TSG-RAN WG1 #90, Aug. 21-25, 2017 Prague, Czech, R1-1713452, 9 pages (Year: 2017).*
(Continued)

*Primary Examiner* — Farid Seyedvosoghi
(74) *Attorney, Agent, or Firm* — Sughrue Mion, PLLC

(57) ABSTRACT

Embodiments of the present disclosure relate to a method, network device, and apparatus for transmitting a preemption indication and a method, terminal device, and apparatus for receiving a preemption indication. In an embodiment of the present disclosure, the method of transmitting a preemption indication may comprise transmitting a preemption indication to a terminal device, wherein the preemption indication indicates information on a portion of resources allocated to a first transmission which is preempted by a second transmission, and wherein the preemption indication is associated with information on structure of the current slot. In embodiments of the present disclosure, by means of information on structure of a subframe, the indication monitoring and overhead for the preemption indication can be reduced remarkably, thereby providing a much more efficient preemption indication solution.

16 Claims, 14 Drawing Sheets

(56) References Cited

U.S. PATENT DOCUMENTS

2018/0309546 A1* 10/2018 Tang ............... H04L 1/1812
2019/0268930 A1* 8/2019 Rudolf ............... H04W 72/14

FOREIGN PATENT DOCUMENTS

| JP | 2018506225 A | 3/2018 |
|----|--------------|--------|
| WO | 2016/118329 A1 | 7/2016 |

OTHER PUBLICATIONS

Huawei, HiSilicon, Discussion on configuration and design of group common pre-emption Indication, 3GPP TSG RAN WGl Meeting #90, Prague, Czech Republic, Aug. 21-25, 2017, RI-1713754, 8 pages (Year: 2017).*

Qualcomm Incorporated, "URLLC DL pre-emption and UL suspension indication channel design," 3GPP TSG-RAN WG1 #90, R1-1713452, Aug. 21-25, 2017, pp. 1-9.

VIVO, "Discussion on pre-emption indication for downlink," 3GPP TSG RAN WG1 Meeting #90, RI-1712867, Aug. 21-25, 2017, 4 pages.

LG Electronics, "Discussion on pre-emption indication for downlink," 3GPP TSG RAN WG1 Meeting #90, R1-1713198, Aug. 21-25, 2017, 5 pages.

Huawei et al., "Discussion on configuration and design of group common pre-emption Indication," 3GPP TSG RAN WG1 Meeting #90, R1-1713754, Aug. 21-25, 2017, 8 pages.

Written Opinion of the International Searching Authority of PCT/CN2017/099510 dated Apr. 28, 2018.

International Search Report of PCT/CN2017/099510 dated Apr. 28, 2018.

Communication dated Jul. 17, 2020, from the European Patent Office in European Application No. 17923724.3.

ZTE, "Contents for Group-common PDCCH", 3GPP TSG RAN WG1 Meeting #90, R1-1712445, Aug. 21-25, 2017, Prague, Czechia, pp. 1-4 (4 pages total).

Intel Corporation, "DL pre-emption indication support in NR", 3GPP TSG RAN WG1 Meeting#90, R1-1712600, Aug. 21-25, 2017, Prague, Czech Republic, pp. 1-5 (5 pages total).

Communication dated Oct. 6, 2020, from the Japanese Patent Office in Application No. 2020-512452, English Translation.

* cited by examiner

METHODS AND APPARATUSES FOR TRANSMITTING AND RECEIVING A PREEMPTION INDICATION

CROSS REFERENCE TO RELATED APPLICATIONS

This application is a National Stage of International Application No. PCT/CN2017/099510 filed Aug. 29, 2017.

FIELD OF THE INVENTION

The non-limiting and exemplary embodiments of the present disclosure generally relate to the field of wireless communication techniques, and more particularly relate to a method, network device, and apparatus for transmitting a preemption indication and a method, terminal device, and apparatus for receiving a preemption indication.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In the wireless communication system, there can be different types of transmissions, such as Ultra-Reliable Low Latency Communications (URLLC) transmission and Enhance Mobile Broadband (eMBB) transmission. When assigned resources of a type of transmission have been partially prompted by another type of transmission, a preemption indicator is usually required to indicate the pre-empted resources.

In 3GPP RAN 1 #88 meeting, the following agreements were made on the preemption indicator:

Indication can be dynamically signaled to user equipment (UE), whose assigned downlink (DL) resources have been partially preempted by another DL transmission, to increase the likelihood of successful demodulation and decoding of Transport Blocks (TBs) transmitted within the above mentioned assigned resource.

The indication may be used to increase the likelihood of successful demodulation and decoding of the TB based on the preempted transmission and/or subsequent (re)-transmissions of the same TB.

IN RAN1 #89 meeting, it was further agreed that when the preemption indication is configured, it informs UE(s) which DL physical resources has been preempted and the preemption indication is transmitted using a Physical Downlink Control Channel (PDCCH).

For illustration purposes, FIG. 1 illustrates an example transmission of URLLC/eMBB multiplexing. As illustrated, resources illustrated by blocks with slashes are used for a first transmission (like eMBB transmission) while a part of these resources are preempted by another transmission (like URLLC transmission) illustrated by blocks with dots. In such a case, an indication can be signaled to a terminal device which is performing the first transmission to inform the preempted resources.

Usually, there are two options to transmit the Group Common—Downlink Control Indication (GC-DCI) for the preemption indication. One option is to configure only one GC-DCI which contains information on all URLLCs. In other words, all terminal devices in a group monitor the same GC-DCI. However, it might require a rather large payload of GC-DCI, and the URCCLs are un-predictable since it is hard to know how many URLLCs will occur. In addition, as illustrated by the bold blocks in FIG. 2, part 4 and part 2 are overlapped with each other in the frequency domain but they will be indicated separately, which causes repeated indications. Moreover, this solution also is involved in an issue on unnecessary indication. As an example, part 1 only relates to eMBB UE 1, 2 and 3, and in fact, eMBB UE 4, 5 does not need to know information on part 1 at all; however, in such a solution, a preemption of part 1 will still be informed to eMBB UE 4 and 5.

Another option is to configure a plurality of GC-DCIs. However, due to the un-predictability, it is required to further indicate the number of GC-DCIs, which means an extra signaling overhead. In addition, UE needs to monitor all the GC-DCIs since it does not know whether to monitor GC-DCI or which GC-DCI to monitor. Thus, the UE might make substantial blind-decoding attempts. Moreover, issues on the repeated indication and unnecessary indication still exist in this option.

In 3GPP technical document R1-1712976, it is proposed to associate different GC-DCIs with different reference regions. As illustrated in FIG. 3A, there are two reference regions, i.e., reference region 1 and reference region 2; GC-DCI 1 is associated with reference region 1 which spans from frequency $f_0$ to $f_1$ and from time $t_0$ to $t_1$; GC-DCI 2 is associated with reference region 2 which spans from frequency $f_2$ to $f_3$ and from time $t_0$ to $t_2$. GC-DCI 1 can be used to indicate any resource preemption within reference region 1; GC-DCI 2 can be used to indicate any resource preemption within reference region 2. These reference regions may be configurable, e.g. by RRC signalling, or configured dynamically if necessary. With this solution, the UE could know which GC-DCI to monitor based on its allocated resource.

However, in this solution, these reference regions are predefined for DCI monitoring, but the second transmission like URLLC may happen at any frequency band and any time position and thus all UE within a reference region shall monitor and decode GC-DCIs associated with the reference region. For example, all UE allocated in the second reference region need to monitor and decode GC-DCI2. In addition, it is also hard to decide the size of GC-DCI2 and the overhead might be very large due to the unpredictability of the URLLC. At the same time, the solution also has issues on repeated indication and unnecessary indication. Moreover, the URLLC might go beyond a reference region. As illustrated in FIG. 3B by the black blocks, both of URLLC transmissions extend beyond reference region 2 (covered with dots) and thus require further preemption indications.

In 3GPP technical document R1-1710123, there was also proposed another solution wherein the available time/frequency resources are divided into two regions, i.e., one region where a possible resource preemption of URRLC transmission can happen and the other region where pre-emption URLLC traffic will not be scheduled, as illustrated in FIG. 4. When UE is in the shared zone, the UE could know this and will monitor possible preemption indications. However, there are still similar issues to those two possible options as mentioned above.

In 3GPP technical document R1-1712668, it was proposed that the scheduling unit of URLLC should start at predefined eMBB symbols within eMBB numerology slot, as illustrated in FIG. 5. In this way, both the DCI monitoring and overhead of the preemption indication could be reduced at the expense of a slightly increased latency of the URLLC traffic.

However, these current solutions cannot meet requirements of efficient preemption indications and thus there is a need for improved preemption indication solution in the art.

SUMMARY OF THE INVENTION

To this end, in the present disclosure, there is provided an improved solution of preemption indication to mitigate or at least alleviate at least part of the issues in the prior art.

According to a first aspect of the present disclosure, there is provided a method of transmitting a preemption indication. The method may comprise transmitting a preemption indication to a terminal device, wherein the preemption indication indicates information on a portion of resources allocated to a first transmission which is preempted by a second transmission, and wherein the preemption indication is associated with information on structure of the current slot.

According to a second aspect of the present disclosure, there is provided method of receiving a preemption indication. The method may comprise monitoring a preemption indication from a network device, wherein the preemption indication indicates information on a portion of resources allocated to a first transmission which is preempted by a second transmission; and decoding the preemption indication based on information on structure of the current slot to obtain the information on the portion of resources.

According to a third aspect of the present disclosure, there is provided a network device. The network device may comprise a transceiver, the transceiver being configured to transmit a preemption indication to a terminal device, wherein the preemption indication indicates information on a portion of resources allocated to a first transmission which is preempted by a second transmission, and wherein the preemption indication is associated with information on structure of the current slot.

According to a fourth aspect of the present disclosure, there is provided a terminal device. The terminal device may comprise a processor, the processor being configured to: monitor a preemption indication from a network device, wherein the preemption indication indicates information on a portion of resources allocated to a first transmission which is preempted by a second transmission, and the processor being further configured to decode the preemption indication based on information on structure of the current slot to obtain the information on the portion of resources.

According to a fifth aspect of the present disclosure, there is provided a computer-readable storage media with computer program codes embodied thereon, the computer program codes being configured to, when executed, cause an apparatus to perform actions in the method according to any embodiment in the first aspect.

According to a sixth aspect of the present disclosure, there is provided a computer-readable storage media with computer program codes embodied thereon, the computer program codes being configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

In embodiments of the present disclosure, by means of information on structure of a subframe, the indication monitoring and overhead for the preemption indication can be reduced remarkably, thereby providing a much more efficient preemption indication solution.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
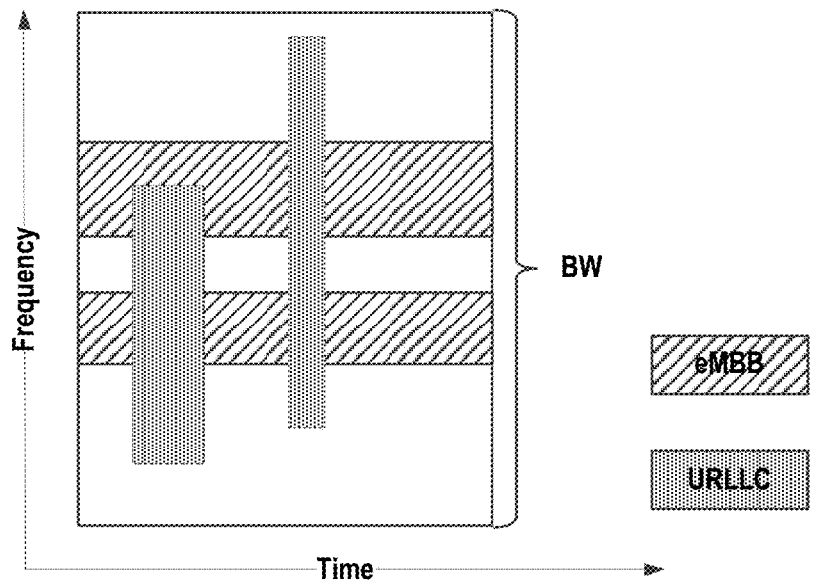
FIG. 1 schematically illustrates an example solution of URLLC/eMBB multiplexing.
Figure 2:
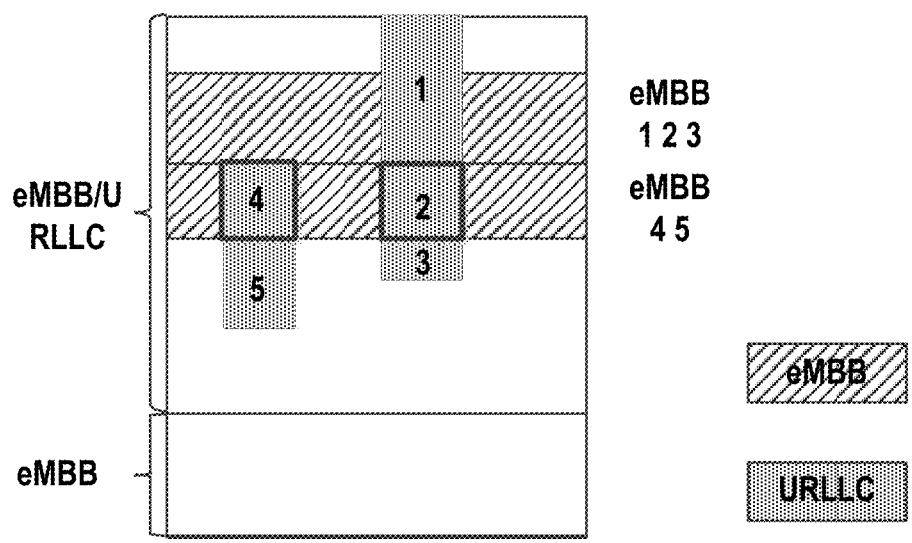
FIG. 2 schematically illustrates another example solution of URLLC/eMBB multiplexing.
Figure 3A:
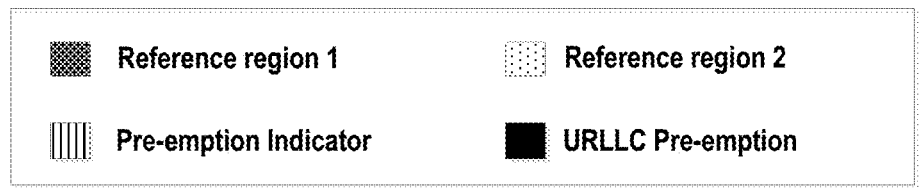
FIGS. 3A and 3B schematically illustrate example preemption indications in the prior art.
Figure 3A:
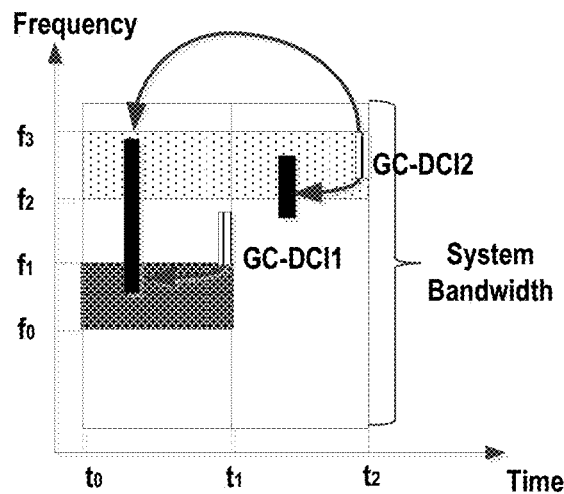
Figure 3B:
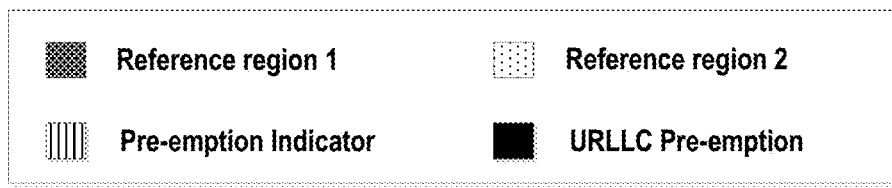
Figure 3B:
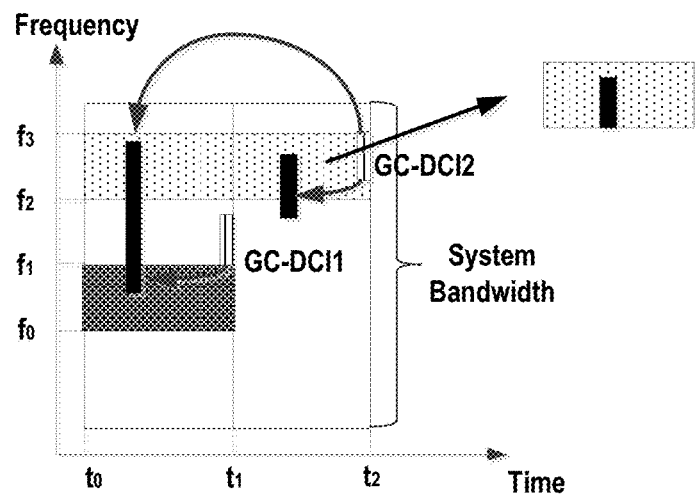
Figure 4:
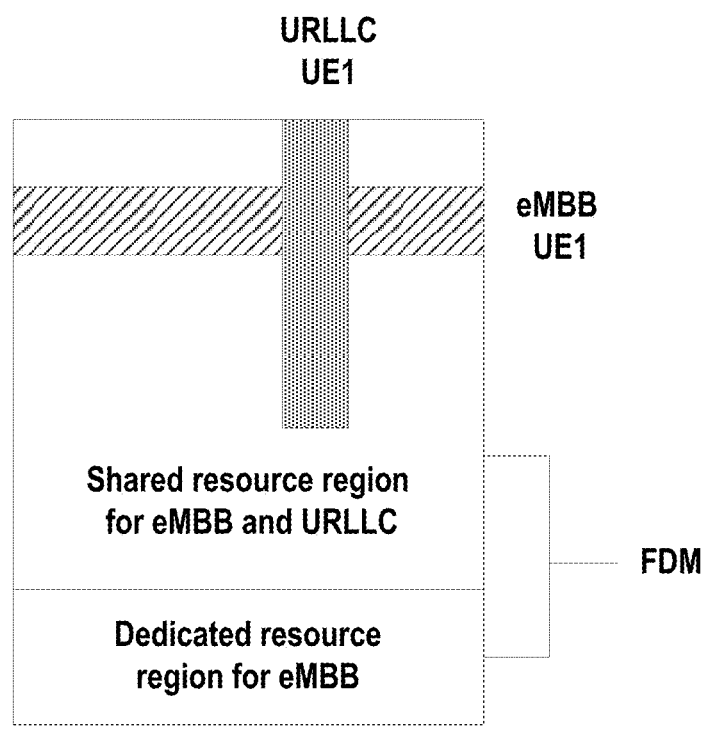
FIG. 4 schematically illustrates further example solution of URLLC/eMBB multiplexing in the prior art.
Figure 5:
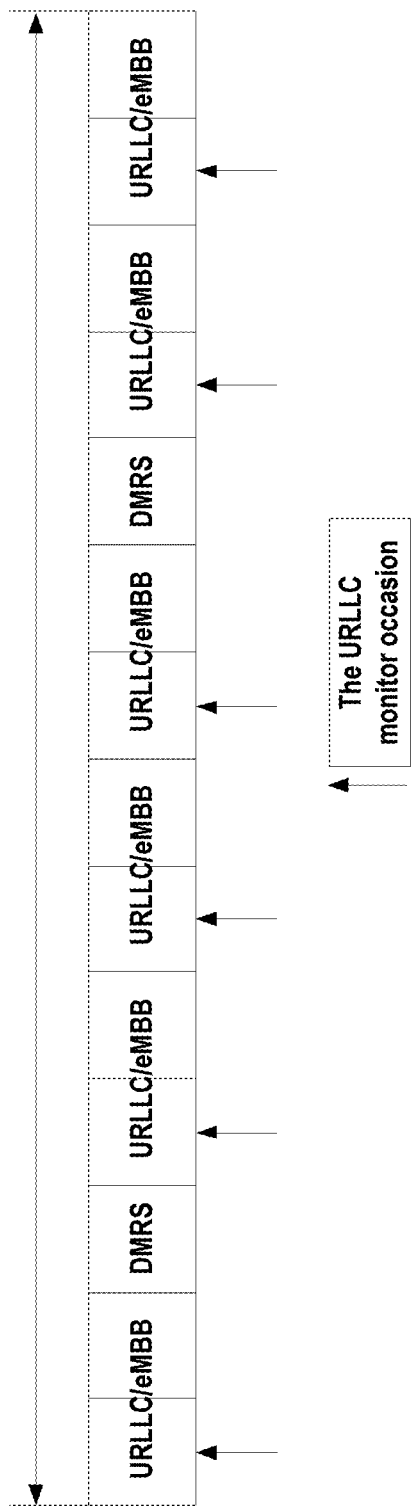
FIG. 5 schematically illustrates example URLLC monitor occasions in the prior art.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR system), a radio header (RH), a remote radio head (RRH), a relay, or a low power node such as a femto, a pico, and so on.

As mentioned in Background, there are several preemption indication solutions in the prior art; however none of them could meet requirements on efficient preemption indication. Thus, to address or at least mitigate the above problem, in the present disclosure, there is proposed an improved solution of preemption indication. For illustrative purposes, reference will be made to FIGS. 6 to 22 to describe the solution of preemption indication as proposed in the present disclosure. It shall be appreciated that all embodiments are given for illustrative purposes and the present disclosure is not limited thereto.

Figure 6:
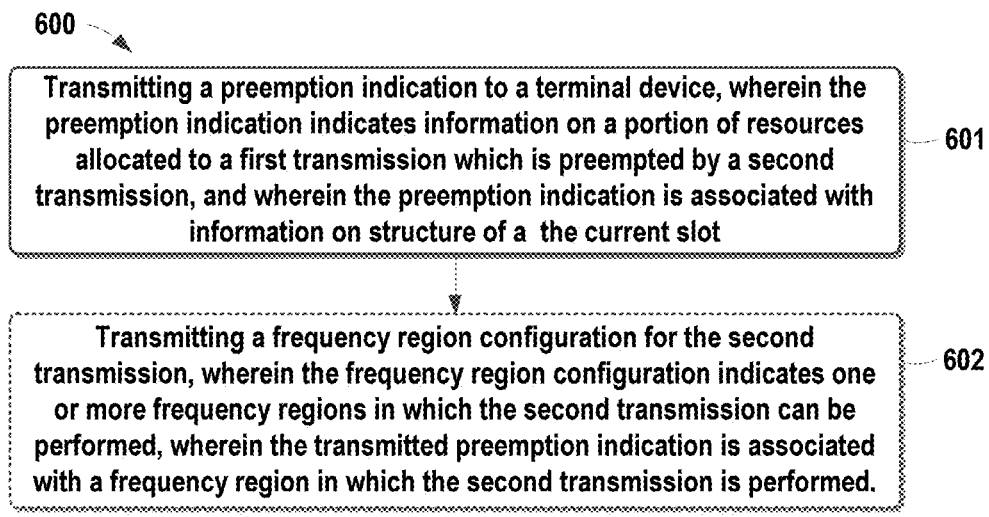
FIG. 6 schematically illustrates a flow chart of a method for transmitting a preemption indication according to an embodiment of the present disclosure.

FIG. 6 schematically illustrates a flow chart of a method 600 for transmitting a preemption indication according to an embodiment of the present disclosure. The method 600 can be performed at a network device, for example gNB, or other network devices like that.

As illustrated in FIG. 6, first in step 601, the network device may transmit a preemption indication to a terminal device. The preemption indication may indicate information on a portion of resources allocated to a first transmission which is preempted by a second transmission. The preemption indication may be associated with information on structure of the current slot.

It can be appreciated that the first transmission and the second transmission are two different transmissions. The first transmission can be, for example, eMBB transmission, and the second transmission can be, for example, URLLC transmission. Hereinafter, the eMBB and the URLLC will be taken as examples of the first and second transmission; however, the skilled in the art could understand that they are just given for illustrative purposes and the present disclosure is not limited thereto.

In addition, the term "structure of the current slot" used herein may refer to format information of the current slot, for example, the number of downlink symbols within the current slot. Slot Format related Information, i.e., SFI, contains such information and thus the UE can learn, from the SFI, the number of downlink symbols of the current slot and even respective positions of "DL" symbols, "UL" symbols or "other" symbols in a slot. It shall be understand that the SFI is just given for illustration purposes and the present disclosure is not limited thereto.

Figure 7:
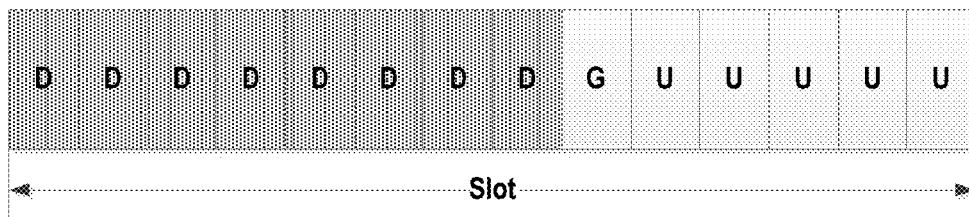
FIG. 7 schematically illustrates an example slot structure according to an embodiment of the present disclosure.

For illustration purposes, FIG. 7 schematically illustrates an example slot having 14 symbols. It shall be appreciated that it is only shown for illustration purposes and the present disclosure is not limited to this example slot structure.

As illustrated in FIG. 7, amongst 14 symbols, there are eight downlink transmission symbols ("D"), one guard symbol ("G") and five uplink transmission symbols ("U"). If the resource preemption is to be indicated by a bitmap, it will require, for the illustrated slot, a bitmap with 14 bits to indicate the preemption condition of these symbols, each bit for one symbol within the slot. However, from the structure of the slot, it can be seen that there are only 8 downlink transmission symbols and thus it may use 8 bits to indicate preemption according SFI. At the same time, from the SFI, the UE can learn that there are 8 downlink transmission symbols and the preemption indication is a bitmap with 8 bits'. In this way, a bitmap with 8 bits are enough for the preemption indication instead of 14 bits. Thus, in the present disclosure, by means of information on structure of the current slot, it is impossible to reduce the overhead of the preemption indication.

Figure 8:
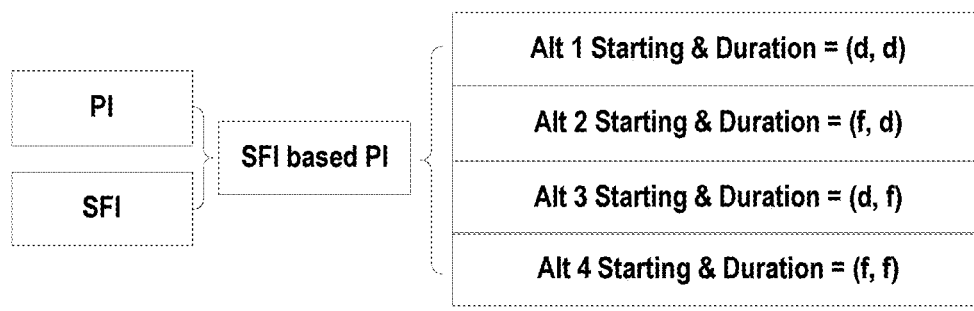
FIG. 8 schematically illustrates possible starting position and duration solutions involved in SFI based preemption indication (PI) according to an embodiment of the present disclosure.

To further reduce the overhead of the preemption indication, it is possible to further restrict possible starting positions and the duration of the URLLC in the time domain. For illustration purposes, FIG. 8 schematically illustrates possible starting position and duration solutions involved in SFI based preemption indication (PI) according to an embodiment of the present disclosure, wherein four options, Alts 1 to 4 are illustrated.

Figure 9:
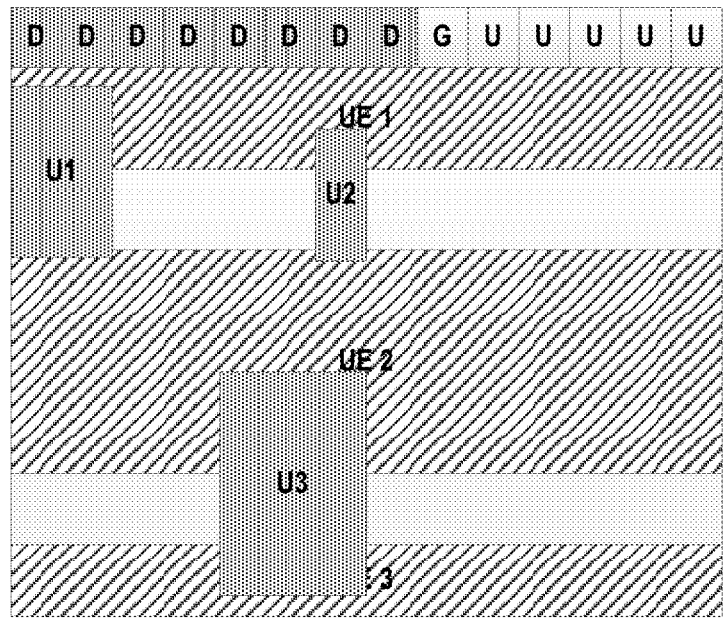
FIG. 9 schematically illustrates an example starting positions and durations of the URLLC in the time domain according to an embodiment of the present disclosure.

For Alt 1, both possible starting positions and the duration are dynamic (indicated by "d"). In other words, the URLLC can start from any downlink symbol and last for any possible time period without any restriction. For example, as illustrated in FIG. 9, the URLLC can start from any of symbols 0 to 7 and it can last for one, two, or three symbols. In such a case, the preemption indication needs to contain both the start position and the duration of the URLLC, for example for DL RA Type 0, 2 and the overhead of the preemption indication is large. It shall be also understand that possible start possible positions are related with the SFI. It can be understand that there are different slot configurations wherein a slot can contain different downlink symbols at different positions. Thus, possible starting positions are dependent on the SFI.

Figure 10:
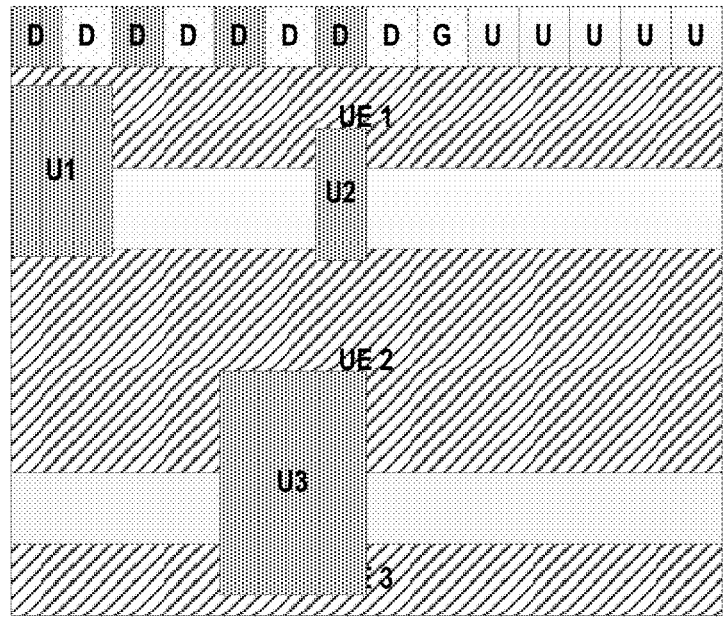
FIG. 10 schematically illustrates another example starting positions and durations of the URLLC in the time domain according to an embodiment of the present disclosure.

For Alt 2, possible starting positions can be fixed (indicated by "f") in a slot but the duration can be dynamic, which means that the URLLC can start from only those predefined symbols but last for any possible time period. For example, as illustrated in FIG. 10, the URLLC can start only from symbols 0, 2, 4 and 6 but it can last for one, two, or three symbols. In such a case, both the start position and the duration of the URLLC are required to indicate the preemption, for example for DL RA Type 0, 2; however, due to the fact that the possible starting positions are restricted, thus overhead of the preemption can be reduced. It shall be understood that in this option, possible start possible position for a particular slot can be predetermined based on the delay requirement. If the delay requirement is not strict, two possible start positions can have a large time interval, while the delay requirement is strict, the possible start positions shall have a small interval.

Figure 11C:
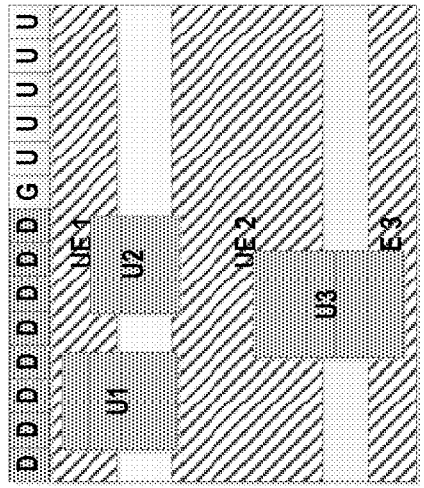
FIGS. 11A to 11C schematically illustrates a further example starting positions and durations of the URLLC in the time domain according to an embodiment of the present disclosure.
Figure 11B:
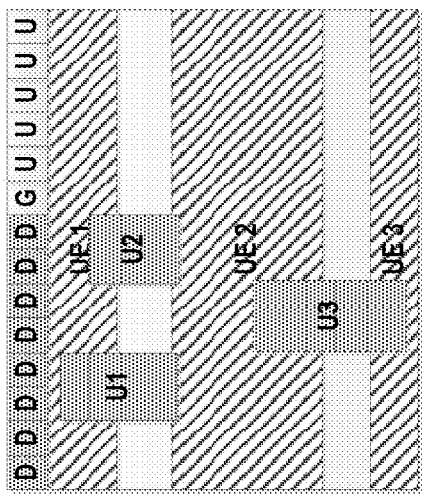
Figure 11A:
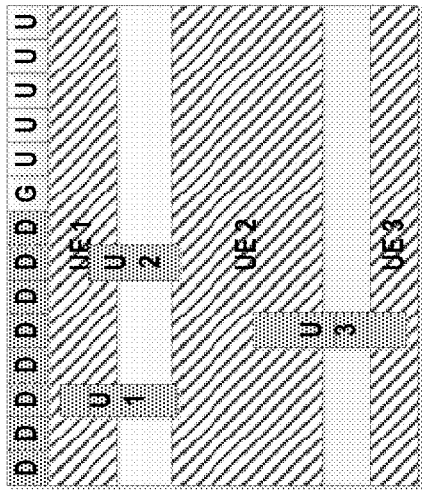

For Alt 3, possible starting positions are dynamic but the duration are fixed, thus the URLLC can start from any downlink symbol but last only for a predefined time period. For illustration purposes, FIGS. 11A to 11C schematically illustrate several example starting positions and durations of the URLLC according to embodiments of the present disclosure. As illustrated in FIG. 11A, the URLLC can start from any of symbols 1 to 8 but it can last for only one symbol; as illustrated in FIG. 11B, the URLLC can start from any of symbols 1 to 8 but it can last for only two symbols; as illustrated in FIG. 11C, the URLLC can start from any of symbols 1 to 8 but it can last only for three symbols. In such a case, due to the fixed duration, it only needs indicate the start position without indicating the duration anymore, and thus it is possible reduce the overhead of the preemption indication. 3 bits can be used to indicate 8 possible start positions. The duration can be signaled in a higher layer signal. Or as an alternative it is also possible contained in the preemption indication. The duration can be fixed based on for example, the traffic amount, the resource requirements, and so on. If the traffic amount or the resource requirement is large, the duration can be determined as a relative long time period, for example, three symbols; while if it is small, the duration can be a short one, for example one symbol.

Figure 12C:
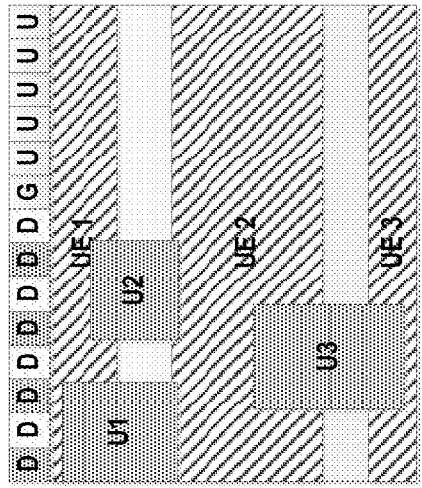
FIGS. 12A to 12C schematically illustrates a still further example starting positions and durations of the URLLC in time domain according to an embodiment of the present disclosure.
Figure 12B:
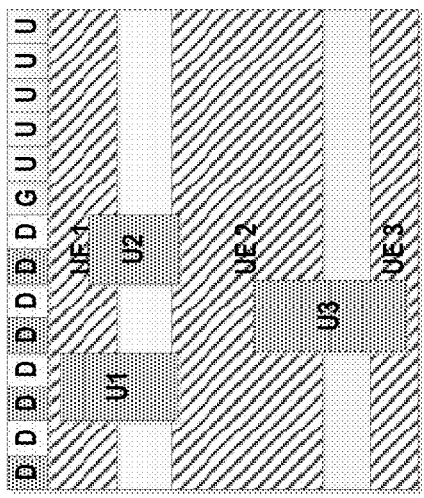
Figure 12A:
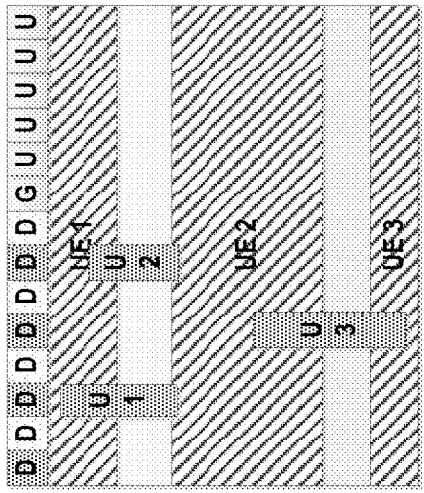

For Alt 4, both possible starting positions and the duration are fixed; that is to say, the URLLC can start from only those predefined symbols and last for only a predefined time period. For illustration purposes, FIGS. 12A to 12C schematically illustrate several example starting positions and durations of the URLLC according to embodiments of the present disclosure. As illustrated in FIG. 12A, the URLLC can start only from symbols 0, 2, 4 and 6 and last for only one symbol; as illustrated in FIG. 12B, the URLLC can start only from symbols 0, 2, 4 and 6 and last for only two symbols; as illustrated in FIG. 12C, the URLLC can start only from symbols 0, 2, 4 and 6 and last only for three symbols. In such a case, due to the fixed duration and the restricted possible start positions, it does not require indicating the duration but only requires fewer bits to indicate the restricted start position. Therefore, it is possible reduce the overhead of the preemption indication remarkably. For example, 2 bits can be used to indicate 4 possible start positions. Similarly, the duration can be signaled in a higher layer signal. Or as an alternative, it is also possible to contain the duration in the preemption indication.

In the present disclosure, there is also proposed a solution of preemption indication in frequency domain, which will be described next with reference to FIGS. 13 and 14.

Figure 13:
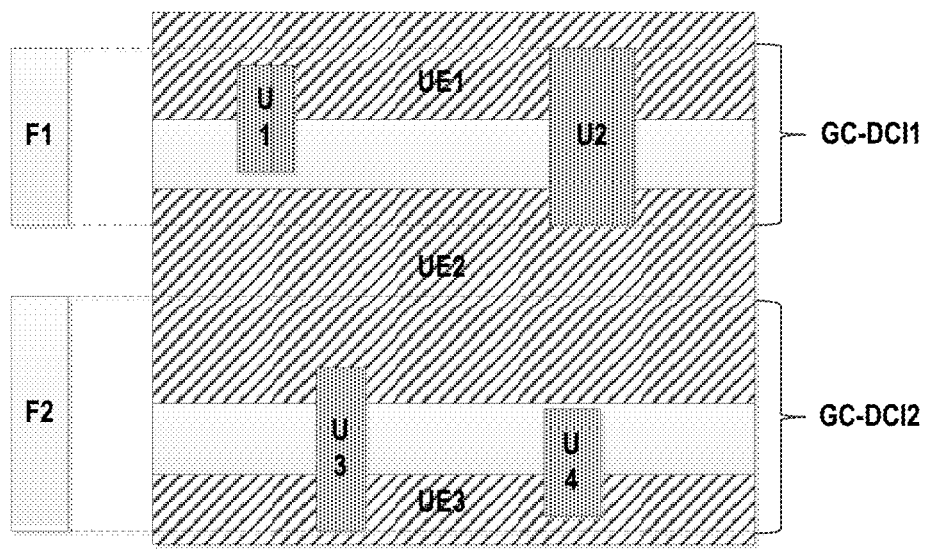
FIG. 13 schematically illustrates a possible preemption indication solution in the frequency domain according to an embodiment of the present disclosure.

As illustrated in FIG. 13, in the frequency domain, one or more frequency regions (like F1 and F2) can be predefined for URLLC. In other words, the URLLC can occur only within these frequency regions F1, F2. Configuration information on these frequency regions can be signaled to all potential impacted eMBB UE via higher layer signal (e.g. RRC). The frequency regions can be contiguous or non-contiguous; sizes in frequency domain of these frequency regions can be same or different; sizes and number of these frequency regions can be configurable in a slot; and the granularity of frequency region may be any of resource block (RB), RBG of eMBB PDSCH, a predetermined fraction of system bandwidth, or the like. For each frequency region, it is possible to have a GC-DCI associated therewith, which means there will be different GC-DCIs for different frequency regions. For example, as illustrated in FIG. 13, the frequency region F1 is associated with GC-DCI 1 while the frequency region F2 is associated with GC-DCI 2.

In such a case, the network device can transmit a frequency region configuration for the second transmission, wherein the frequency region configuration indicates one or more frequency regions in which the second transmission can be performed. The transmitted preemption indication can be associated with a frequency region in which the second transmission is performed.

Meanwhile, at the terminal device, each eMBB UE can monitor GC-DCI only when its allocated resource is overlapped with any of the frequency region and the monitored GC-DCI is the GC-DCI associated with the overlapped frequency region. For example, as illustrated in FIG. 14, UE1 monitors and decodes GC-DCI 1 for PI; UE3 monitors and decodes GC-DCI 2 for PI; UE2 monitors and decodes both GC-DCI 1 and GC-DCI 2 for PI. In such case, it just needs to indicate the URLLC resources in time-domain, and the eMBB UE can figure out the frequency-domain resource (rectangle in bold lines) according to preconfigured frequency regions by determining whether its allocated resource is overlapped with any of the preconfigured frequency regions.

Figure 14:
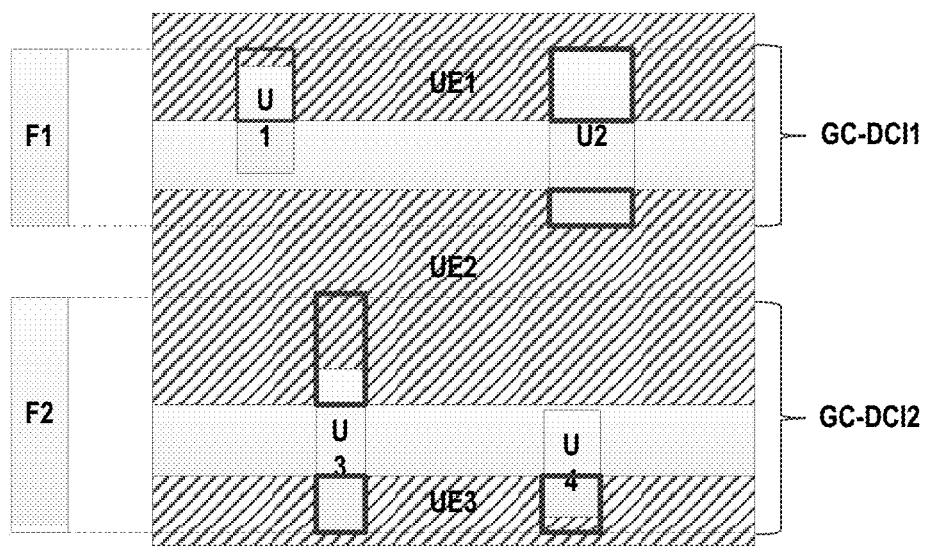
FIG. 14 schematically illustrates implicit preemption indication for the terminal device in the frequency domain according to an embodiment of the present disclosure.

In addition, from FIG. 14, some frequency resources (as illustrated by those parts of rectangle in bold lines not overlapping with the URLLC transmission) are not used by URLLC but the terminal device will deem it as a part of the preempted frequency domain resource. To address this issue, the gNB may assign frequency resources for URLLC from at least one of the boundaries of the preconfigured URLLC frequency region, or may assign all the predefined frequency resources to the URLLC. In addition, it is also possible that the gNB retransmits all the eMBB data transmitted in rectangles in bold lines.

It shall be appreciated that although the preemption indication in frequency domain is described independent of the preemption indication in the time domain, they can be combined together as a new preemption indication solution. In such a case at step 602, the network device may further transmit a frequency region configuration for the second transmission, wherein the frequency region configuration indicates one or more frequency regions in which the second transmission can be performed. The transmitted preemption indication may be associated with a frequency region in which the second transmission is performed. Hereinafter, reference will be made to FIGS. 15 to 18C to describe the combined solution in details.

Figure 15:
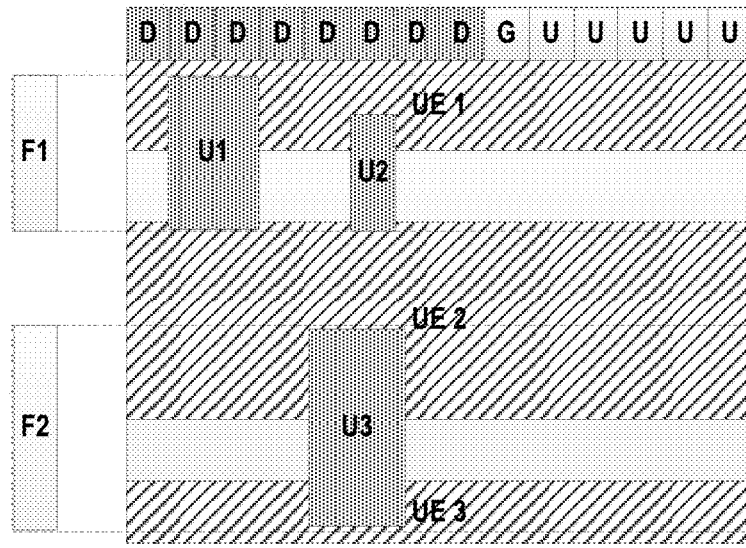
FIG. 15 schematically illustrates a possible preemption indication solution in the time and frequency domains according to an embodiment of the present disclosure.

FIG. 15 schematically illustrates a possible preemption indication solution in the time and frequency domains where both the starting position and the duration of the URLLC are dynamic. As illustrated in FIG. 15, the URLLC can start from any downlink symbol and last for any possible time period, but can only occur within in the frequency regions F1 and F2. In such a case, both the start position and the duration of the URLLC are required to indicate the preemption but resource preemption in the frequency domain is not required in the preemption indication.

Figure 16:
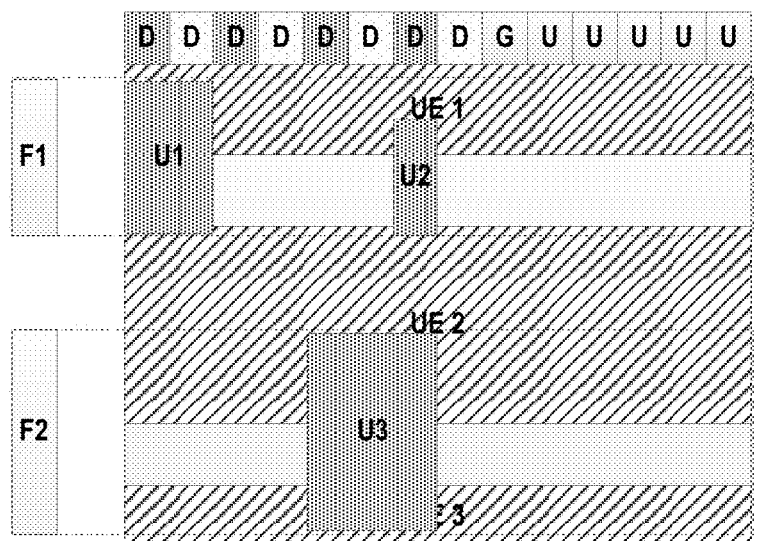
FIG. 16 schematically illustrates another possible preemption indication solution in the time and frequency domains according to an embodiment of the present disclosure.

FIG. 16 schematically illustrates a possible preemption indication solution in the time and frequency domains where the starting position is restricted and the duration of the URLLC is dynamic. As illustrated in FIG. 16, the URLLC can start only from symbols 0, 2, 4 and 6 but it can only last for one, two, three symbols and occur within in the frequency regions F1 and F2. In such a case, both the start position and the duration of the URLLC are required to indicate the preemption but resource preemption in the frequency domain is not required; meanwhile, due to the fact that the possible starting positions are restricted, overhead of the preemption can be reduced.

Figure 17C:
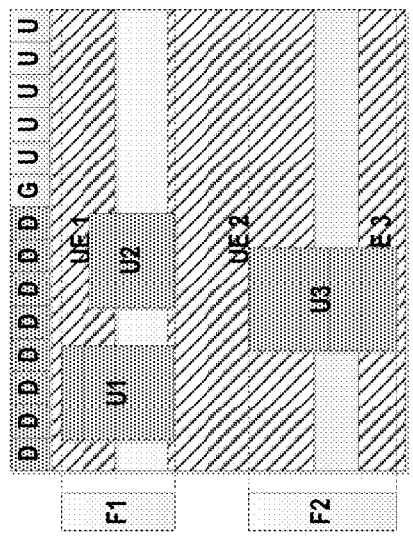
FIGS. 17A to 17C schematically illustrate a further possible preemption indication solution in the time and frequency domains according to an embodiment of the present disclosure.
Figure 17B:
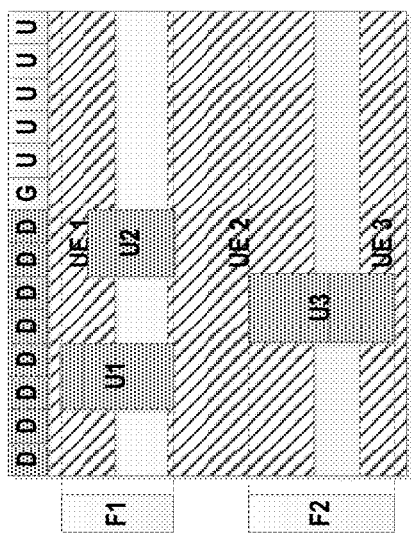
Figure 17A:
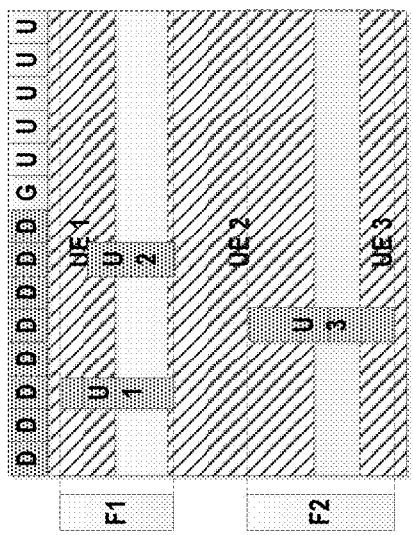

FIGS. 17A to 17C schematically illustrate a further possible preemption indication solution where the starting position of the URLLC is dynamic but the duration of the URLLC is fixed. As illustrated in FIG. 17A, the URLLC can start from any of symbols 1 to 8 but it can only last for one symbol and occur only within in the frequency regions F1 and F2; as illustrated in FIG. 17B, the URLLC can start from any of symbols 1 to 8 but it can last for only two symbols occur only within in the frequency regions F1 and F2; as illustrated in FIG. 17C, the URLLC can start from any of symbols 1 to 8 but it can last for only three symbols and occur only within in the frequency regions F1 and F2. In such a case, due to the fixed duration, it only needs to indicate the start position without indicating the duration anymore and meanwhile resource preemption in the frequency domain is not required, and thus it is possible reduce the overhead of the preemption indication.

Figure 18C:
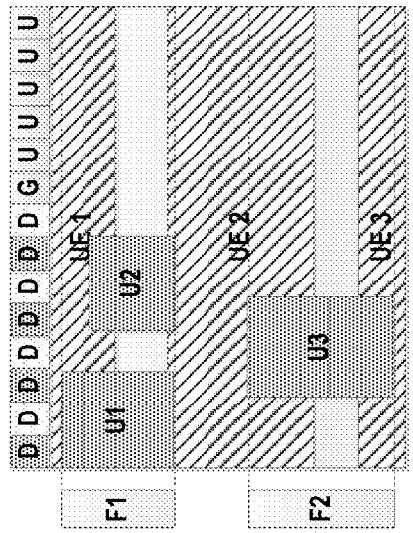
FIGS. 18A to 18C schematically illustrate a still further possible preemption indication solution in the time and frequency domains according to an embodiment of the present disclosure.
Figure 18B:
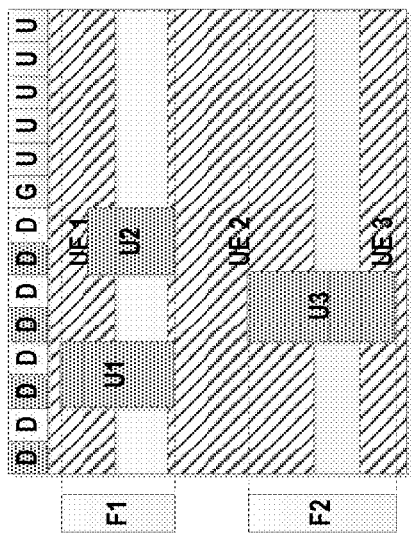
Figure 18A:
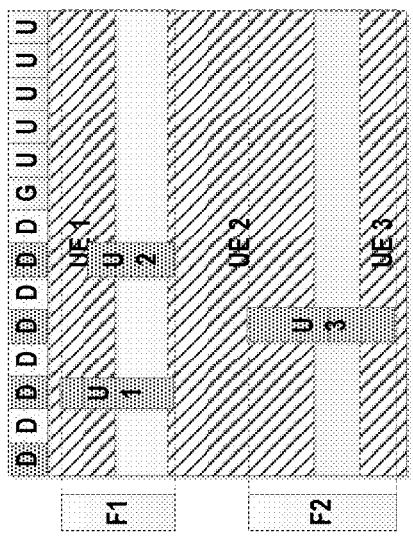

FIGS. 18A to 18C schematically illustrate a still further possible preemption indication solution where both the starting position and the duration of the URLLC are fixed. As illustrated in FIG. 18A, the URLLC can start only from symbols 0, 2, 4 and 6, last for only one symbol and occur only within in the frequency regions F1 and F2; as illustrated in FIG. 18B, the URLLC can start only from symbols 0, 2, 4 and 6, last for only two symbols and occur only within in the frequency regions F1 and F2; as illustrated in FIG. 18C, the URLLC can start only from symbols 0, 2, 4 and 6, last for only three symbols and occur only within in the frequency regions F1 and F2. In such a case, due to the fixed duration and the restricted possible start positions, it does not require to indicate the duration and frequency preemption and only requires less bits to indicate the restricted start position and thus it is possible substantially reduce the overhead of the preemption indication.

Hereinbefore, the preemption indication solution at the network device is described with reference to embodiments of the present disclosure and next the preemption indication solution at the network device will be described with reference to FIG. 19.

Figure 19:
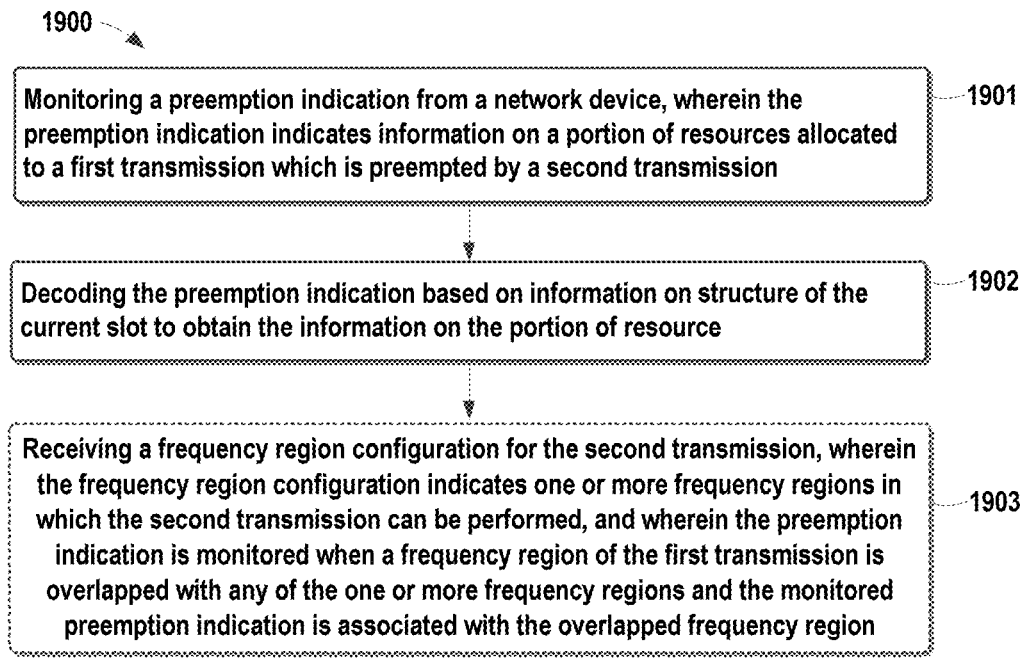
FIG. 19 schematically illustrates a flow chart of a method of receiving a preemption indication according to an embodiment of the present disclosure.

FIG. 19 illustrates a flow chart of method 1900 of receiving a preemption indication according to an embodiment of the present disclosure. The method 1900 can be performed at a terminal device, for example UE, or other like terminal devices.

As illustrated in FIG. 19, first in step 1901, the terminal device in the NR system, like UE, may monitor a preemption indication from a network device. The preemption indication indicates information on a portion of resources allocated to a first transmission which is preempted by a second transmission.

At step 1902, the terminal device may decode the preemption indication based on information on structure of the current slot to obtain the information on the portion of resources. In other words, the preemption indication transmitted from the network device is associated with information on structure of the current slot. The SFI may indicate the information on structure of the current slot and thus from the SFI, the terminal device could know the structure of the current slot, particularly the number of the downlink symbols. Based on the SFI, the terminal device can learn the bits of the indication to obtain the portion of resources allocated to a first transmission which is preempted by a second transmission.

In an embodiment of the present disclosure, the preemption indication solution for the frequency domain can be combined with that in the time domain. In such a case, in step 1903, the terminal device may further receive a frequency region configuration for the second transmission, wherein the frequency region configuration indicates one or more frequency regions in which the second transmission can be performed. Thus, the terminal device can only monitor the preemption indication when a frequency region of the first transmission is overlapped with any of the one or more frequency regions and the terminal only needs to monitor the preemption indication associated with the overlapped frequency region.

In an embodiment of the present disclosure, the preemption indication contains only resource preemption information in a time domain. For example, when the terminal device receives the frequency region configuration for the second transmission and it can learn whether its allocated frequency resource is overlapped with the frequency regions for the second transmission. If it is overlapped with the frequency regions, the overlapped frequency region will represent the frequency preemption information of the second transmission. In such a case, it is clear that it will be enough to contain only resource preemption in the time domain within the preemption indication.

In an embodiment of the present disclosure, the preemption indication may contain a start symbol and duration of the second transmission. For example, both the start position and the duration are required especially when both of the start symbol and duration of the second transmission are dynamic.

In another embodiment of the present disclosure, the duration of the second transmission can be fixed and the preemption indication may contain only a start symbol of the second transmission.

In a further embodiment of the present disclosure, possible start symbols of the second transmission are restricted to predefined symbols.

With embodiments of the present disclosure, overhead for the preemption indication can be reduced remarkably by means of information on structure of a subframe, thereby providing a much more efficient preemption indication solution. In addition, in a further embodiment of the present disclosure, the second transmission can be restricted to predetermined frequency regions, and the predetermined frequency regions can be signaled to the terminal devices in advance. In such a case, it is possible omit the resource preemption in the frequency domain, thereby further reducing the overhead of the preemption indication.

Figure 20:
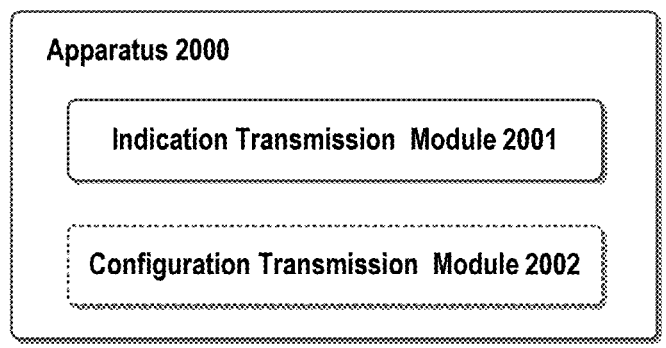
FIG. 20 schematically illustrates a diagram of an apparatus for transmitting a preemption indication according to an embodiment of the present disclosure.

FIG. 20 further illustrates an apparatus for transmitting a preemption indication according to an embodiment of the present disclosure. Apparatus 2000 can be implemented at a network device such as gNB.

As illustrated in FIG. 20, apparatus 2000 may comprise an indication transmission module 2001. The indication transmission module 2001 may be configured to transmit a preemption indication to a terminal device, wherein the preemption indication indicates information on a portion of resources allocated to a first transmission which is preempted by a second transmission. Particularly, the preemption indication can be associated with information on structure of the current slot.

In an embodiment of the present disclosure, apparatus 200 may further a configuration transmission module 2002. The configuration transmission module 2002 may be configured to transmit a frequency region configuration for the second transmission, wherein the frequency region configuration indicates one or more frequency regions in which the second transmission can be performed. In such an event, the transmitted preemption indication is associated with a frequency region in which the second transmission is performed.

In a further embodiment of the present disclosure, the preemption indication may contain only resource preemption information in a time domain.

In a still further embodiment of the present disclosure, the preemption indication may contain a start symbol and duration of the second transmission.

In a yet further embodiment of the present disclosure, the duration of the second transmission may be fixed and the preemption indication may contain only a start symbol of the second transmission.

In a yet still further embodiment of the present disclosure, possible start symbols of the second transmission may be restricted to predefined symbols.

Figure 21:
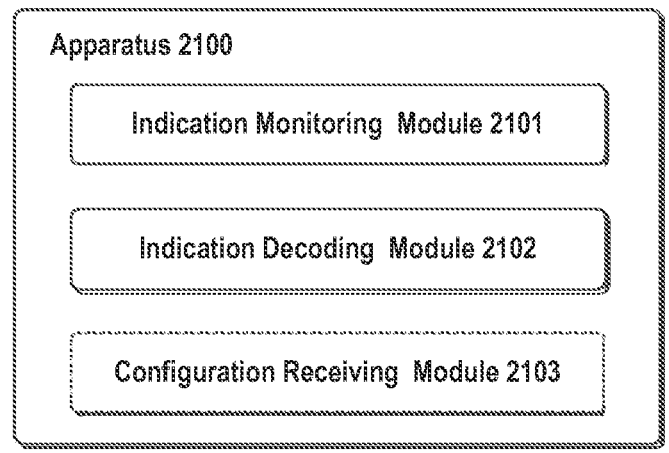
FIG. 21 schematically illustrates a diagram of an apparatus for receiving a preemption indication according to an embodiment of the present disclosure.

FIG. 21 illustrates a block diagram of receiving a preemption indication according to an embodiment of the present disclosure. Apparatus 2000 can be implemented at a terminal device such as UE.

As illustrated in FIG. 2100, apparatus 2100 may comprise an indication monitoring module 2101 and an indication decoding module 2102. The indication monitoring module 2101 may be configured to monitoring a preemption indication from a network device, wherein the preemption indication indicates information on a portion of resources allocated to a first transmission which is preempted by a second transmission. The indication decoding module 2102 may be configured to decode the preemption indication based on information on structure of the current slot to obtain the information on the portion of resources.

In an embodiment of the present disclosure, apparatus 2100 may further a configuration receiving module 2103. The configuration transmission module 2103 may be configured to receive a frequency region configuration for the second transmission, wherein the frequency region configuration indicates one or more frequency regions in which the second transmission can be performed. In such an event, the indication monitoring module 2101 may be further configured to monitor the preemption indication only when a frequency region of the first transmission is overlapped with any of the one or more frequency regions and monitor only a preemption indication associated with the overlapped frequency region In a further embodiment of the present disclosure, the preemption indication may contain only resource preemption information in a time domain.

In a still further embodiment of the present disclosure, the preemption indication may contain a start symbol and duration of the second transmission.

In a yet further embodiment of the present disclosure, the duration of the second transmission may be fixed and the preemption indication may contain only a start symbol of the second transmission.

In a yet still further embodiment of the present disclosure, possible start symbols of the second transmission may be restricted to predefined symbols.

Hereinbefore, the apparatuses 2000 and 2100 are described with reference to FIGS. 20 and 21 in brief. It is noted that the apparatuses 2000 and 2100 may be configured to implement functionalities as described with reference to FIGS. 6 to 19. Therefore, for details about the operations of modules in these apparatuses, one may refer to those descriptions made with respect to the respective steps of the methods with reference to FIGS. 6 to 19.

It is further noted that components of the apparatuses 2000 and 2100 may be embodied in hardware, software, firmware, and/or any combination thereof. For example, the components of apparatuses 2000 and 2100 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 2000 and 2100 may comprise at least one processor. The at least one processor suitable for use with embodiments of the present disclosure may include, by way of example, both general and special purpose processors already known or developed in the future. Apparatuses 2000 and 2100 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2000 and 2100 to at least perform operations according to the method as discussed with reference to FIGS. 6 to 19 respectively.

Figure 22:
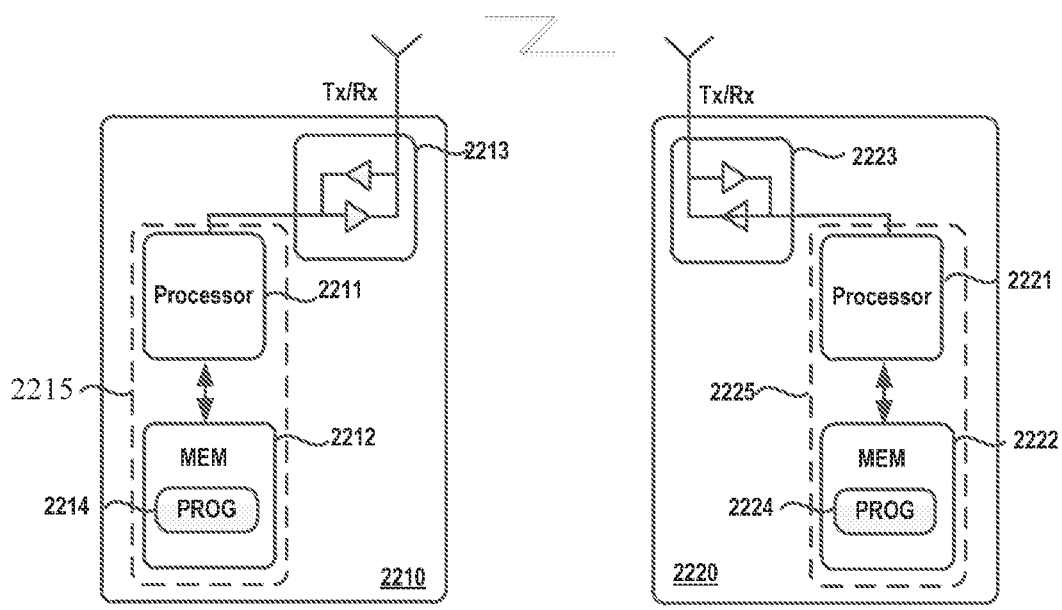
FIG. 22 further illustrates a simplified block diagram of an apparatus 2210 that may be embodied as or comprised in a network device (like gNB), and an apparatus 2220 that may be embodied as or comprised in a terminal device like UE as described herein.

FIG. 22 further illustrates a simplified block diagram of an apparatus 2210 that may be embodied as or comprised in a network device like a base station (such as gNB) in a wireless network and an apparatus 2220 that may be embodied as or comprised in a terminal device like UE as described herein.

The apparatus 2210 comprises at least one processor 2211, such as a data processor (DP) and at least one memory (MEM) 2212 coupled to the processor 2211. The apparatus 2210 may further comprise a transmitter TX and receiver RX 2213 coupled to the processor 2211, which may be operable to communicatively connect to the apparatus 2220. The MEM 2212 stores a program (PROG) 2214. The PROG 2214 may include instructions that, when executed on the associated processor 2211, enable the apparatus 2210 to operate in accordance with embodiments of the present disclosure, for example the method 600. A combination of the at least one processor 2211 and the at least one MEM 2212 may form processing means 2215 adapted to implement various embodiments of the present disclosure.

The apparatus 2220 comprises at least one processor 2221, such as a DP, and at least one MEM 2222 coupled to the processor 2221. The apparatus 2220 may further comprise a suitable TX/RX 2223 coupled to the processor 2221, which may be operable for wireless communication with the apparatus 2210. The MEM 2222 stores a PROG 2224. The PROG 2224 may include instructions that, when executed on the associated processor 2221, enable the apparatus 2220 to operate in accordance with the embodiments of the present disclosure, for example to perform the method 1900. A combination of the at least one processor 2221 and the at least one MEM 2222 may form processing means 2225 adapted to implement various embodiments of the present disclosure.

Various embodiments of the present disclosure may be implemented by computer program executable by one or more of the processors 2211, 2221, software, firmware, hardware or in a combination thereof.

The MEMs 2212 and 2222 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2211 and 2221 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method comprising:
   receiving, by a first User Equipment (UE), first information and a preemption indication from a base station, the first information indicating a number of downlink symbols configured in a slot;
   determining, by the first UE, a first resource set based on the first information; and
   identifying, by the first UE, based on the preemption indication, that a first transmission of a Physical Downlink Shared Channel (PDSCH) to the first UE is preempted by a second transmission related to latency requirement in a first portion of resources within the first resource set,
wherein the preemption indication corresponds to a number of symbols of the first resource set, and
wherein a timing corresponding to the first resource set is prior to receiving the preemption indication.

2. The method of claim 1, further comprising:
receiving second information from the base station in a Radio Resource Control (RRC) signaling,
wherein the first UE determines, based on the second information, whether the first portion of resources is indicated by the preemption indication in a granularity of one of contiguous portions into which a bandwidth configured for the first UE is equally divided.

3. The method of claim 1, wherein the preemption indication contains only resource preemption information in a time domain.

4. The method of claim 1, wherein the preemption indication contains a start symbol and duration of the first portion.

5. The method of claim 1, wherein possible start symbols of the first portion are restricted to predefined symbols.

6. The method of claim 1, wherein the first information is a Slot Format related Information (SFI).

7. The method of claim 6, wherein the preemption indication is based on the SFI.

8. A method comprising:
determining, by a base station, first information and a preemption indication, the first information indicating a number of downlink symbols configured in a slot; and
transmitting, by the base station, the first information and the preemption indication to a first User Equipment (UE),
wherein the preemption indication indicates that a first transmission of a Physical Downlink Shared Channel (PDSCH) to the first UE is preempted by a second transmission related to latency requirement in a first portion of resources within a first resource set,
wherein the first resource set is based the first information,
wherein the preemption indication corresponds to a number of symbols of the first resource set, and
wherein a timing corresponding to the first resource set is prior to transmitting the preemption indication.

9. The method of claim 8, further comprising:
transmitting, by the base station, second information to the first UE in a Radio Resource Control (RRC) signaling,
wherein, whether the first portion of resources is indicated by the preemption indication in a granularity of one of contiguous portions into which a bandwidth configured for the first UE is equally divided, is based on the second information.

10. The method of claim 8, wherein the preemption indication contains only resource preemption information in a time domain.

11. The method of claim 8, wherein the preemption indication contains a start symbol and duration of the first portion.

12. The method of claim 8, wherein possible start symbols of the first portion are restricted to predefined symbols.

13. A first User Equipment (UE), comprising:
a receiver configured to receive first information and a preemption indication from a base station, the first information indicating a number of downlink symbols configured in a slot; and
a controller configured to:
determine a first resource set based on the first information; and
identify, based on the preemption indication, that a first transmission of a Physical Downlink Shared Channel (PDSCH) to the first UE is preempted by a second transmission related to latency requirement in a first portion of resources within the first resource set,
wherein the preemption indication corresponds to a number of symbols of the first resource set, and
wherein a timing corresponding to the first resource set is prior to receiving the preemption indication.

14. The first UE of claim 13, wherein
the receiver is further configured to receive second information from the base station in a Radio Resource Control (RRC) signaling, and
the controller is further configured to determine, based on the second information whether the first portion of resources is indicated by the preemption indication in a granularity of one of contiguous portions into which a bandwidth configured for the first UE is equally divided.

15. A base station, comprising:
a controller configured to determine first information and a preemption indication, the first information indicating a number of downlink symbols configured in a slot; and
a transmitter configured to transmit the first information and the preemption indication to a first User Equipment (UE),
wherein the preemption indication indicates that a first transmission of a Physical Downlink Shared Channel (PDSCH) to the first UE is preempted by a second transmission related to latency requirement in a first portion of resources within a first resource set,
wherein the first resource set is based the first information,
wherein the preemption indication corresponds to a number of symbols of the first resource set, and
wherein a timing corresponding to the first resource set is prior to transmitting the preemption indication.

16. The base station of claim 15, wherein
the transmitter is further configured to transmit second information to the first UE in a Radio Resource Control (RRC) signaling,
wherein, whether the first portion of resources is indicated by the preemption indication in a granularity of one of contiguous portions into which a bandwidth configured for the first UE is equally divided, is based on the second information.

* * * * *